March 14, 1961 C. F. McBRIDE 2,974,963
SPREADING ATTACHMENT FOR LAWN MOWERS
Filed Nov. 20, 1958 2 Sheets-Sheet 1

INVENTOR.
CHARLES F. McBRIDE
BY
Barnes, Kisselle, Raisch & Choate
ATTORNEYS

March 14, 1961  C. F. McBRIDE  2,974,963
SPREADING ATTACHMENT FOR LAWN MOWERS
Filed Nov. 20, 1958  2 Sheets-Sheet 2
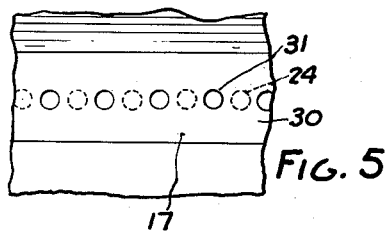
FIG. 5
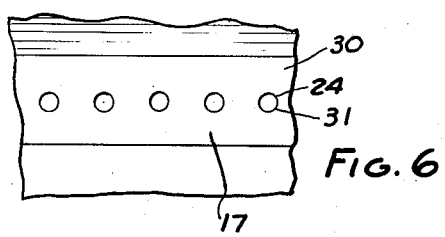
FIG. 6
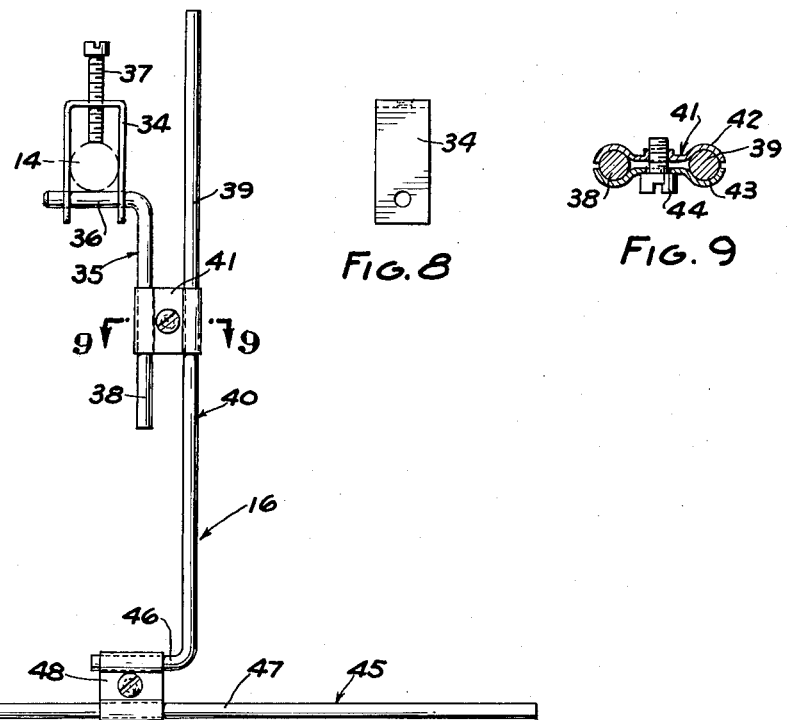
FIG. 8  FIG. 9
FIG. 7
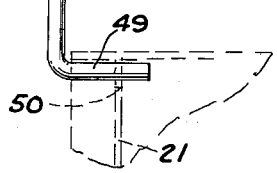
INVENTOR.
CHARLES F. McBRIDE
BY
Barnes, Kisselle, Raisch & Choate
ATTORNEYS

United States Patent Office 2,974,963
Patented Mar. 14, 1961

2,974,963

SPREADING ATTACHMENT FOR LAWN MOWERS

Charles F. McBride, 427 Mortimer St., Sturgis, Mich.

Filed Nov. 20, 1958, Ser. No. 775,181

7 Claims. (Cl. 275—2)

This invention relates to a spreading attachment for lawn mowers adapted to be mounted on the handle of a lawn mower for spreading fertilizer, seed and the like.

It is an object of this invention to provide a novel spreading attachment adapted to be mounted on the handle of a lawn mower and to be actuated by the normal swinging movement of the handle as the lawn mower is moved along the ground to thereby dispense fertilizer, seed and the like.

It is a further object of this invention to provide such an attachment which incorporates a novel container.

It is a further object of this invention to provide such an attachment wherein the container is disposable.

In the drawings:

Fig. 5 is a fragmentary sectional view taken along the line 5—5 in Fig. 2.

Fig. 6 is a view similar to Fig. 5 showing the parts in a different relative position.

Fig. 7 is an elevational view of one of the hangers for the container.

Fig. 8 is an end view of one of the clamps shown in Fig. 7.

Fig. 9 is a fragmentary sectional view taken along the line 9—9 in Fig. 7.

Figure 1:
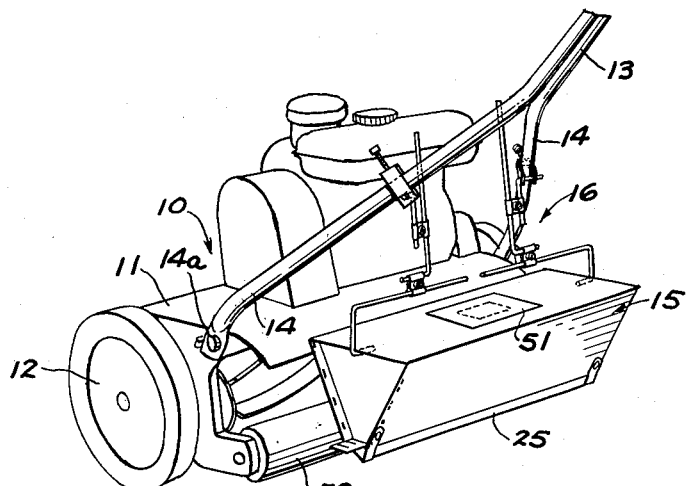
Fig. 1 is a perspective view of a lawn mower having a spreader embodying the invention attached thereto.

Referring to Fig. 1, a conventional lawn mower 10, herein shown as being of the reel type, comprises a frame 11 having wheels 12 rotatably mounted thereon for supporting the frame 11 for movement along the ground. A handle 13 bifurcated adjacent its lower end into arms 14 is pivoted to the frame as at 14a. Handle 13 extends upwardly and is adapted to be grasped by an operator for guiding movement of the lawn mower along the ground.

A container 15 for fertilizer or other pulverulent material to be spread, is pivotally supported from arms 14 of the handle by a hanger structure 16. Container 15 is provided with openings so when the lawn mower is moved along the ground the normal vibration and swinging movement of the handle 13 causes the contents of the container 15 to be dispensed onto the ground.

Container 15 is preferably made of a disposable material such as cardboard so that after the contents are dispensed the container may be thrown away and a new container filled with seed, fertilizer or the like may be purchased.

Figure 2:
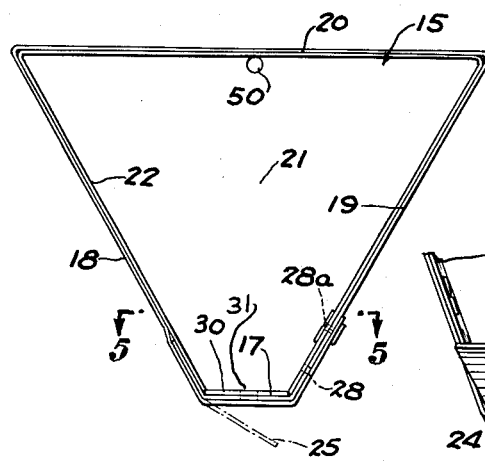
Fig. 2 is an end view of the container of the spreading attachment shown in Fig. 1.
Figure 3:
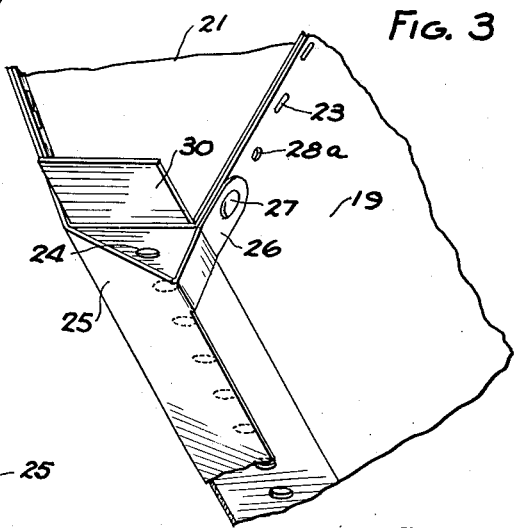
Fig. 3 is a perspective view of the container shown in Fig. 2.
Figure 4:
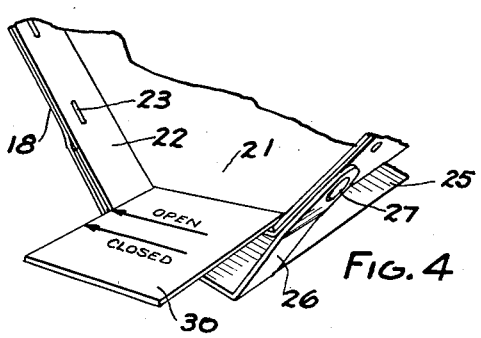
Fig. 4 is a fragmentary perspective view of the container from a different angle from that of Fig. 3.

As shown in Figs. 2, 3 and 4, container 15 is made of a single panel of material folded along spaced lines to form a bottom wall 17, side walls 18, 19 which converge downwardly toward the bottom wall and a top wall 20. As a result, the cross sectional configuration of the container 15 is generally trapezoidal or triangular. End walls 21 are provided to close the ends of the container and include a peripheral lip 22 which is fixed to the bottom wall 17, side walls 18, 19 and top wall 20 by staples 23 or any other suitable means.

Bottom wall 17 is provided with a plurality of longitudinally spaced dispensing openings 24. In addition, the container includes a downwardly and rearwardly extending ledge 25 which is integral with the side wall 18. Where the container is made of a material such as cardboard, the ledge 25 is held in position by tabs 26 integral therewith and provided with bendable fasteners 27 engaging an opening 28 in the side wall 19. During handling of the container and prior to its being mounted on the lawn mower, fasteners 27 may be engaged with another opening 28a in wall 19 to hold the ledge 25 up against bottom wall 17 and thereby close openings 24.

With the ledge 25 extending downwardly and rearwardly, the contents of the container are dispensed through openings 24 onto the ledge and thereafter rearwardly onto the ground. The volume flow of material through the openings 24 is controlled primarily by a bar 30 of cardboard or the like which overlies bottom wall 17. Bar 30 is provided with openings 31 which are adapted to be moved into and out of register with the openings 24 in bottom wall 17. One end of bar 30 extends through one of the end walls 21 to serve as a means for grasping the bar. Proper indicia marks are provided on bar 30 as shown in Fig. 4 to point out to an operator in what position the openings 24, 31 are in register and in what position the openings are out of register.

Container 15 is supported on handle 13 by two hangers 16, the construction of which is shown in Figs. 1 and 7. Each hanger includes a first L-shaped member 35 of rod or heavy wire which has one leg thereof mounted on the arm 14 of the lawn mower handle.

Leg 36 of member 35 extends through the legs of a U-shaped clamp 34. A screw 37 threaded through the base of clamp 34 engages arm 14 to clamp the leg 36 in position. The other leg 38 of L-shaped member 35 extends downwardly. Leg 39 of a second L-shaped member 40 of rod or heavy wire is adjustably mounted on leg 38 of member 35 by a clamp 41 which includes spaced plates 42, 43 which are clamped together by a screw 44.

A U-shaped member 45 of rod or heavy wire is provided adjacent the other leg 46 of the second member 40 and the long leg 47 thereof is adjustably mounted on leg 46 of member 40 by a clamp 48 which is identical to clamp 41. The short leg 49 of U-shaped member 45 is shorter than the first leg 47 and extends inwardly into engagement with an opening 50 in the upper end of end wall 21 of the container.

By this arrangement, each hanger 16 is adjustable vertically and transversely so that the container 15 can be mounted on lawn mower handles of different sizes and in addition different sized containers may be used.

Specifically, in order to adjust the device for different sized handles, clamps 41 and 48 may be loosened to adjust members 35, 40. In order to adjust for different sized containers of fertilizer and the like, clamps 48 may be loosened to enable shifting of the L-shaped members 45 inwardly or outwardly.

In use, the operator obtains a container 15 of fertilizer, seed or the like and mounts it in position on the lawn mower. As the lawn mower is moved along the ground and guided by the handle 13, the normal variations in contour of the ground and the vibration of the lawn mower motor cause the handle 13 to vibrate upwardly and downwardly. As a result, the container vibrates and the fertilizer, seed or the like passes downwardly through the openings 31, 24 onto the ledge 25. Continued vibration of the handle as the lawn mower moves along the ground causes the contents to be distributed from the ledge 25 in an even layer along the ground. When the operator reaches the end of a path and turns the lawn mower, the swinging and vibration of the handle is substantially lessened, and as a result, little or no fertilizer or seed is discharged thereby minimizing any waste or burning of the grass due to excessive fertilizer being disposed thereon.

Since the container 15 is made of a disposable material such as cardboard, a convenient means of handling the fertilizer is provided, thereby eliminating any danger of injury to the operator due to either contact with the toxic fertilizer or the possibility of inhaling the toxic fertilizer or having it reach the eyes. In case it is desired to re-use the container 15, a suitable, closable opening as indicated at 51 may be provided in the upper wall 20 for filling the container from a bulk supply of material. The container 15 may be made of other materials such as sheet metal.

In adjusting the hangers 16 for positioning container 15, it is preferable to locate the container 15 such that the ledge 25 is disposed close to the ground and close to the guide roller 52 of the mower, in the case of a reel-type mower. This substantially eliminates the possibility of the material spread from being blown away by the wind. In addition, the grass cuttings discharged from the mower will tend to carry the material discharged from the container 15 downward to the ground and will tend to cover the material to prevent it from being blown away by the wind.

I claim:

1. In a lawn mower the combination comprising a frame, wheels mounted on said frame for supporting said frame for movement along the ground, a handle pivoted to said frame and extending upwardly therefrom, the lower portion of said handle including a pair of spaced apart arms, a container for fertilizer and the like having discharge openings adjacent the lower end thereof, and means for pivotally supporting the opposite ends of said container one on each arm of said handle above the center of gravity of the container comprising, a first L-shaped member, a clamp for mounting one leg of said first L-shaped member on its respective arm on the handle, a second L-shaped member, a second clamp for mounting one leg of said second L-shaped member to the other leg of said first L-shaped member, a J-shaped member having a longer leg and a shorter leg, a third clamp for clamping the longer leg of said J-shaped member to the other leg of said second L-shaped member, said J-shaped member having its shorter leg extending parallel to the longer leg thereof, said container having openings therein adapted to be engaged by said shorter legs of said J-shaped members.

2. A container for fertilizer and the like, means for pivotally supporting said container on the handle of a lawn mower, said container comprising top, bottom, side and end walls, said container being generally trapezoidal in cross section, said container having openings in the bottom wall thereof, means for controlling the flow of material through said opening, means forming a ledge extending along the length of said container below and spaced from said bottom wall of said container, and means adjacent the upper end of said container and adapted to form a connection for mounting on said handle wherein said means for pivotally supporting said container on the handle of the lawn mower comprises means at each end of the container comprising a first L-shaped member, means for clamping one leg of said first L-shaped member on the handle, a second L-shaped member, means for adjustably clamping one leg of said second L-shaped member to the other leg of said first L-shaped member, a J-shaped member, means for adjustably supporting said other leg of said second L-shaped member on one leg of said J-shaped member, the other leg of said U-shaped member being adapted to be received in an opening in the end wall of said container located above the center of gravity of the container.

3. In a lawn mower, the combination comprising a frame, wheels on said frame for supporting said frame for movement along the ground, a handle pivoted to said frame and extending upwardly and adapted to be gripped by an operator for guiding the movement of the mower along the ground, a pair of arms fixed on said handle and depending downwardly therefrom with the lower ends thereof spaced substantially from the handle, a container for fertilizer and the like having dispensing openings therein, and means for pivotally suspending said container on the lower ends of said arms for movement about a transverse axis above the center of gravity of the container, whereby the contents of the container are dispensed when the lawn mower is moved along the ground by the combined movement of the lower ends of the arms and the pivotal movement of the container on the arms.

4. The combination set forth in claim 3 wherein said arms comprise wire rods having inwardly extending projections, said container having openings therein adapted to be engaged by said projections.

5. The combination set forth in claim 3 wherein said container includes means forming a ledge extending rearwardly and downwardly from the body of the container, said ledge being more horizontal than vertical such that as the lawn mower is moved along the ground, the contents of the container pass downwardly onto the ledge and are thereafter distributed from the ledge in an even layer along the ground.

6. A container adapted to be mounted on the handle of a lawn mower for spreading feed, fertilizer and like materials, said container having opposed side walls the lower portions of which converge toward one another, a bottom wall extending across and closing the space between the lower edges of said opposed side walls, said bottom wall having a series of dispensing openings therein for dispensing the material within the container, a ledge member, means for hinging said ledge member along one edge thereof to one of said side walls and movable from a position underlying said bottom wall and closing said dispensing openings to a position angularly inclined to said bottom wall and forming a shelf on which the material dispensed through said dispensing openings is deposited, tabs on said ledge member, the side wall of said container adjacent the free edge of said ledge member having spaced openings therein, means extending through each tab member into a spaced opening for holding said ledge member in position relative to the container, said tabs being of such a length that when said latter means extend into one of said openings the ledge member underlies the bottom wall and closes the dispensing openings and when said latter means extend through said tabs into the other of said openings said ledge member is in position to form the shelf.

7. The combination set forth in claim 6 wherein said one side wall and said ledge member are made of a single piece of material, said means for hinging said ledge member to said side wall comprising a fold line.

References Cited in the file of this patent

UNITED STATES PATENTS

| | | |
|---|---|---|
| 15,974 | Havis | Oct. 28, 1856 |
| 879,535 | Fullilove | Feb. 18, 1908 |
| 1,751,346 | Mazak | Mar. 18, 1930 |
| 2,180,253 | Moore | Nov. 14, 1939 |
| 2,639,571 | Kelly | May 26, 1953 |
| 2,720,407 | Mermelstein | Oct. 11, 1955 |